No. 855,568. PATENTED JUNE 4, 1907.
C. W. GRISWOLD.
AUTOMATIC FEED TROUGH.
APPLICATION FILED JULY 3, 1906.
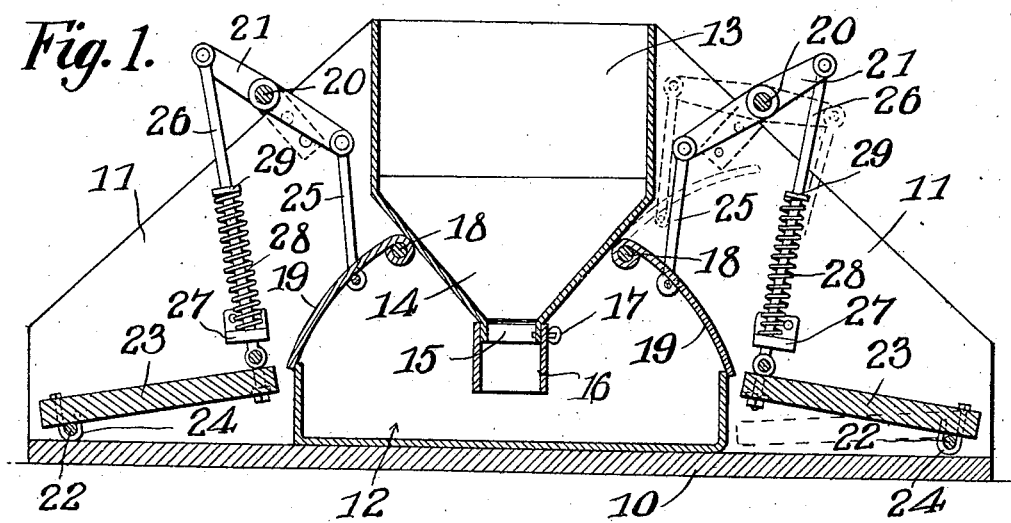
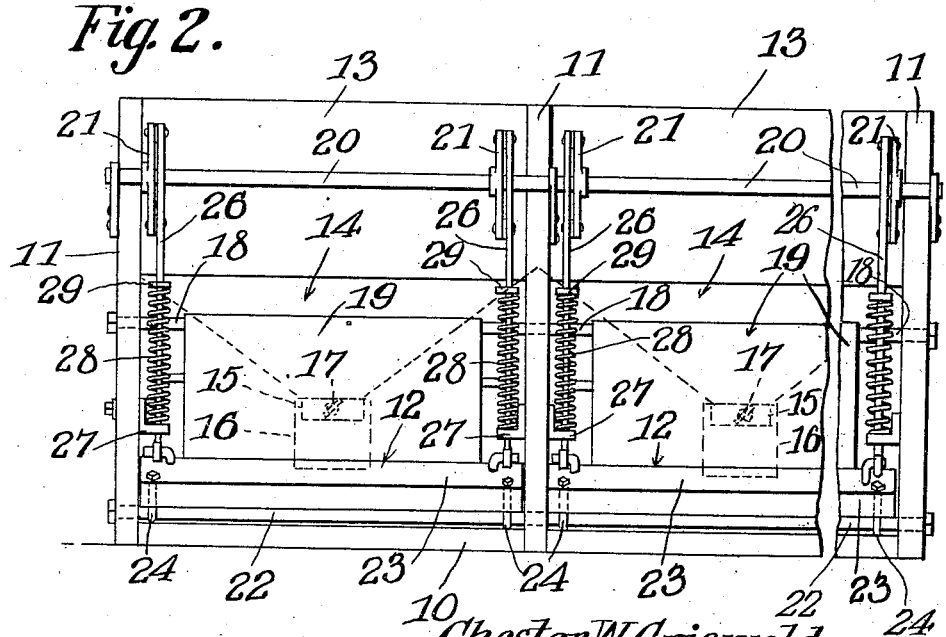
WITNESSES:
Chester W. Griswold,
INVENTOR
By C. A. Snow & Co.
ATTORNEYS

UNITED STATES PATENT OFFICE.

CHESTER WARD GRISWOLD, OF MILAN, KANSAS.

AUTOMATIC FEED-TROUGH.

No. 855,568.  Specification of Letters Patent.  Patented June 4, 1907.

Application filed July 3, 1906. Serial No. 324,625.

*To all whom it may concern:*

Be it known that I, CHESTER WARD GRISWOLD, a citizen of the United States, residing at Milan, in the county of Sumner and State of Kansas, have invented a new and useful Automatic Feed-Trough, of which the following is a specification.

This invention relates to feed troughs for animals wherein the weight of the animals is utilized to uncover the trough at the approach of the animal and which is automatically closed when the animal retires, and has for its object to simplify and improve the construction and increase the efficiency and utility of devices of this character.

With these and other objects in view, which will appear as the nature of the invention is better understood, the invention consists in certain novel features of construction as hereafter fully described and claimed.

In the accompanying drawings forming a part of this specification and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings: Figure 1 is a sectional view of the improved apparatus; and Fig. 2 is a side elevation.

The improved device is preferably arranged with a plurality of feed troughs associated with one storage bin or other source of supply, and for the purpose of illustration the device is shown thus arranged, with a plurality of the feed troughs and their automatically operated closures associated with a single receptacle for the feed.

The improved device in its approved form consists of a base 10 divided by spaced vertical partitions 11 into separate transversely disposed compartments and accessible from opposite sides of the base.

Each compartment is provided with a feed trough 12, preferably of sheet metal, and also accessible through the open sides of the compartments.

Extending through the partitions 11 near the entrances to the compartments and transversely thereof are outer tie rods 22, and extending through the partitions nearer their centers and above the feed troughs and transversely of the compartments, are inner tie rods 18.

Extending from end to end of the base 10 and above the partitions and the compartments formed thereby, is a feed receptacle 13 having hopper-shaped pockets 14 depending between the inner tie rods and corresponding in number with the compartments, each pocket terminating in a tubular discharge spaced from the floors of the feed troughs.

The tubular discharge members terminate at a considerable distance above the floors of the troughs, so that the coarser qualities of feed such as ear corn will freely pass, and to adapt the device to the finer qualities of feed such as shelled corn, ground feed and the like, tubular extensions 16 are attached removably to the discharge portions 14 as by clamp screws 17, or other suitable fastening means.

The tubular extensions or sleeves extend sufficiently near the floor of the feed troughs to prevent the feed from escaping too freely, but will be discharged only so fast as the animal consumes it.

Swinging from the inner tie rods 18 are the closures 19 of the feed troughs, and swinging upon the outer tie rods 22 are platforms 23, one in each compartment, and extending inwardly from each side and toward the feed troughs.

Extending transversely of the partitions 11 are rods 20, and swinging upon these rods are lever arms 21, preferably two for each of the feed compartments. The inner ends of the lever arms 21 are connected to the covers 19 by rods 25, and the outer ends of the lever arms are coupled to the tilting platforms by rods 26, the connecting rods and lever arms being so proportioned and arranged that the covers 19 are in closed position when the platforms are in elevated position. Then it will be obvious that when an animal steps upon one of the movable platforms and thus depresses it, the cover 19 associated with that particular platform will be elevated and afford the animal access to the feed in the trough, while all the other troughs will remain covered.

The covers 19 and their operating mechanism being independent, one animal may feed from any one of the troughs, or as many animals may feed simultaneously as there are feed compartments.

The connecting rods 26 pass through brackets 27 on the partitions 11, and each is supplied with a spring 28 bearing at one end upon the bracket and attached at the other end, at 29, to the rod 26, and thus exerting their force to hold the tilting platforms yieldably in elevated position and the covers 19 in closed position, and to automatically return the covers to their closed position when the animals retire from the platforms.

Thus the feed troughs are protected when not in use, and access thereto by smaller animals, such as rats, gophers, and the like prevented.

The device may be easily adapted to animals of all sizes and species, or to poultry and other stock, as may be required.

What is claimed is:

1. In an apparatus of the class described, a supporting base, a plurality of partitions spaced apart and extending transversely of said base and forming a corresponding number of independent compartments open at the sides, a feed trough disposed in each of said compartments and accessible from the open sides of the same, outer tie rods extending through said partitions and transversely of said compartments near their outer sides, inner tie rods extending through said partitions and transversely of said compartments and above said feed troughs, a feed receptacle extending transversely of said compartments and between said inner tie rods and having an independent discharge communicating with each of said feed troughs, platforms swinging upon the outer tie rods in each of said compartments between the open sides of the same and the feed troughs, a closure for each of said feed troughs and swinging from said inner tie rods, means for maintaining said platforms yieldably in elevated position, and connecting means between said platforms and closures whereby the depression of the platforms will elevate the closures.

2. In a stock feeding device, a supporting structure, a feed trough located upon the structure, a feed receptacle provided with a discharge spaced from the bottom of the feed trough, a swinging closure to the feed trough, a pivoted platform mounted upon the structure, a lever pivoted upon the structure, a rod connecting one end of said lever with said closure and a spring actuated rod connecting the opposite end of said lever with the free end of said platform.

In testimony that I claim the foregoing as my own, I have hereto affixed my signature in the presence of two witnesses.

CHESTER WARD GRISWOLD.

Witnesses:
R. S. HAMMOND,
ETHEL BEALS.